United States Patent
Croisant et al.

[11] 3,709,571
[45] Jan. 9, 1973

[54] BEARING HOLDER

[75] Inventors: John A. Croisant, Midland; Harold D. Folts, Rhodes, both of Mich.

[73] Assignee: The Dow Chemical Company, Midland, Mich.

[22] Filed: March 11, 1971

[21] Appl. No.: 123,283

[52] U.S. Cl. .................................................308/27
[51] Int. Cl. .............................................F16c 35/10
[58] Field of Search ........308/27; 248/49, 58, 59, 62, 248/63

[56] References Cited

UNITED STATES PATENTS

| | | | |
|---|---|---|---|
| 327,524 | 10/1885 | Chivill | 308/27 |
| 729,356 | 5/1903 | King et al. | 308/27 |
| 2,835,464 | 5/1958 | Kolodin | 248/62 |

*Primary Examiner*—Milton Kaufman
*Assistant Examiner*—Barry Grossman
*Attorney*—Griswold & Burdick, Robert W. Selby and Stephen S. Grace

[57] ABSTRACT

A support for bearings is described which comprises a support member with an inner wall portion of a closed end having a configuration adapted to engage a bearing wall portion; a releasable bearing restraining member slidably received within the support member with an outer wall portion at a first end thereof adapted to engage the bearing wall portion substantially simultaneously with the engaging of the bearing by the support member; and a clamping means in operative combination with a second end of the restraining member to exert a sufficient force on the restraining member to restrain the bearing within the inner and outer wall portions.

8 Claims, 3 Drawing Figures

PATENTED JAN 9 1973 3,709,571

INVENTORS.
John A. Croisant
Harold D. Folts
BY Robert W. Selby
ATTORNEY

BEARING HOLDER

BACKGROUND OF THE INVENTION

This invention relates to supports and more particularly to supports or retainers to hold bushings and/or bearings.

Bearings or bushings are frequently maintained in a substantially immobile position by hangers or supports, which are held together by multiple bolts or screws. Installation and removal of a bearing or bushing in such a device can be time consuming and difficult in corrosive environments, for example, a bearing located within a conduit transporting an acid or a caustic composition. A device adapted to afford rapid removal of a bearing from such device with a minimum of human contact with the corrosive environment is desired.

An object of this invention is to provide a device for holding bearings.

It is another object of this invention to provide a bearing holder adapted to simplify installation and removal of bearings.

It is a further object of this invention to provide a bearing holder adapted to simplify installation and removal of bearings positioned within corrosive environments.

Other objects and advantages of this invention will become apparent during the course of the following description.

SUMMARY OF THE INVENTION

The above objects have been achieved in a bearing retaining device comprising a bearing support member, a releasable bearing restraining member, and a clamping means in operative combination with said bearing restraining member. The bearing support member has an open end and a closed end. At the closed end of said bearing support member, an inner wall portion has a configuration adapted to engage an exterior longitudinal wall portion of a bearing placed in mechanical contact with the inner wall portion. Two effectively parallel, spaced apart elongated legs extend from the closed end of said bearing support member. Said releasable bearing restraining member, having a first end and a second end, is suited to be slidably received between the elongated legs of said support member. At the first end of said restraining member an outer wall portion of a configuration adapted to engage an outer longitudinal portion of a bearing is positioned in operative opposing relationship to the support member inner wall portion. By operative opposing relationship, it is meant that the closed end inner wall portion of said support member and the first end outer wall portion of said restraining member can simultaneously engage a bearing or bushing to prevent substantial movement of said bearing or bushing. The restraining member further includes an elongated force transmitting appendage extending from the first end in a direction generally opposite the outer first end wall portion.

Specific sections of the bearing retaining device are effectively parallel when a sufficient force can be transmitted by the elongated appendage, from the clamping means, to retain a bearing within the closed end inner wall portion of said support member and the first end outer wall portion of said restraining member without significantly deforming the elongated legs of said support member or the elongated appendage of said restraining member.

The clamping means is so positioned to exert a sufficient force through the elongated appendage, in a direction toward the first end of said restraining member, to restrain a bearing within said restraining member outer wall portion and said support member inner wall portion.

BRIEF DESCRIPTION OF THE DRAWING

The accompanying drawing further illustrates the invention.

Identical numerals, distinguished by a letter suffix, within the several figures represent parts having a similar function within the different embodiments.

DESCRIPTION OF THE PREFERRED EMBODIMENTS

Figure 1:
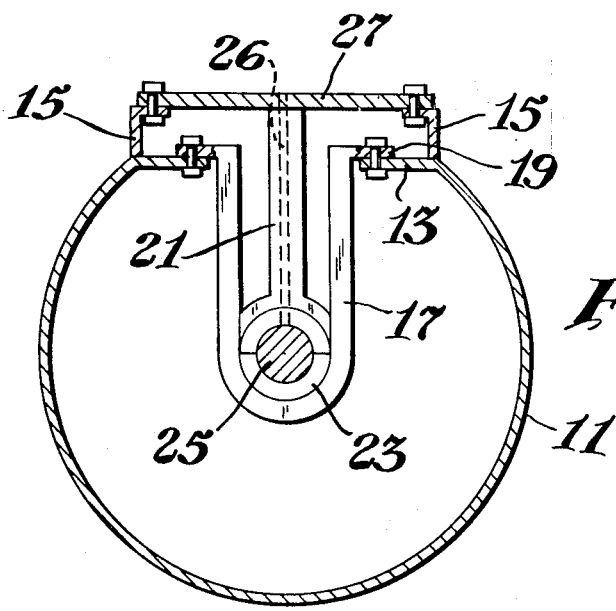
FIG. 1 is a schematic representation of an apparatus employing the claimed device within a conduit.

In FIG. 1 is depicted a partial cross-sectional transverse view of an apparatus employing the bearing retaining device of the claimed invention. A longitudinally extending, peripherally enclosed conduit or pipe 11 is adapted to receive said bearing retaining device through a wall section of the pipe 11. Receiving flanges 13 extend inwardly toward each other from the wall of pipe 11 at a cut away section of pipe 11. Receiving flanges 13 can be integrally or removably attached to the wall of pipe 11. A clamping brace 15 is attached to receiving flange 13 by, for example, welding or bolting. Bearing support member 17 is attached to receiving flanges 13 utilizing a support fastening means such as welding or a support flange 19 having bolts extending through the support flange 19 and receiving flange 13. A releasable bearing restraining member 21 is positioned within bearing support member 17 and seats on the outer longitudinal defining surface of hollow split bearing or bushing 23. Within hollow bushing 23 is positioned a shaft 25. The restraining member can define an optional lubricate passage 26 to provide lubrication to bushing 23 and shaft 25. A clamping means such as bolts or pressure plate 27 is removably attached to clamping brace 15 to induce downwardly directed forces on releasable bearing restraining member 21, thereby securing split bushing 23 in a substantially stationary position.

Figure 2:
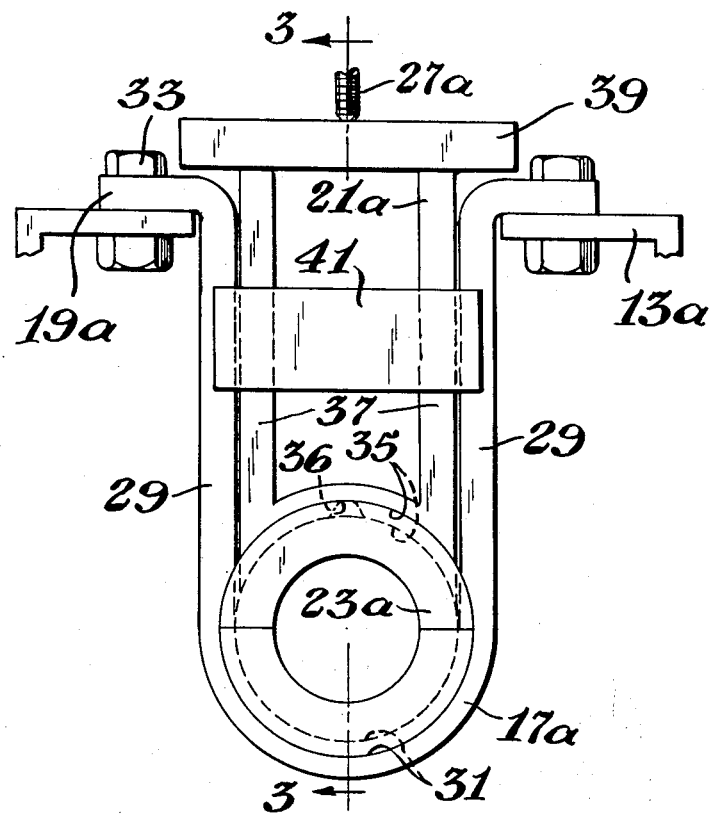
FIG. 2 is an end view of an embodiment of the invention.
Figure 3:
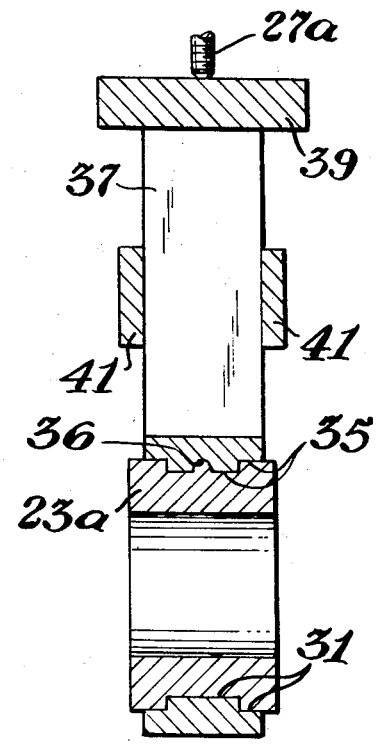
FIG. 3 is a sectioned longitudinal view of the embodiment of FIG. 2 along plane 3—3.

FIGS. 2 and 3 illustrate a preferred embodiment of the claimed device which comprises bearing support member 17a having spaced apart substantially parallel elongated legs 29 extending from a closed end to an open end. At the closed end of bearing support member 17a, an inner wall portion 31 is of a configuration suited to engage the outer longitudinal periphery of bearing 23a. Optionally, the entire inner wall surfaces of said bearing support can be adapted to engage an exterior longitudinal wall portion of said bearing, thereby readily permitting insertion of a one piece bearing into the closed end of bearing support member 17a from the open end of said bearing support member. The support member can be removably attached to a fixed body, such as partially shown receiving flanges 13a by a support fastening means, for example, support flanges 19a and bolts 33.

A releasable bearing restraining member 21a is designed to be slidably and removably inserted between spaced apart legs 29 of support member 17a. An outer wall portion 35 of a first end of bearing restraining member 21a is preferably contoured to accept the outer longitudinal peripheral configuration of bearing 23a. The outer wall portion 35 also preferably includes a locking means as recess 36 to inhibit annular movement of bearing 23a. At least one and preferably two spaced apart substantially parallel elongated force transmitting appendages 37 extend from the first end of restraining member 21a to second end of said restraining member. Optionally, a pressure equalizing means such as stiffener 39 can be positioned between the elongated appendages 37 at the second end of said restraining member. The stiffener 39 can be attached to the elongated appendages by common means known to those skilled in the art. The stiffener 39 is suited to substantially uniformly distribute forces, applied to said stiffener by a clamping means or pressure bolt 27a to the elongated appendages 37.

A guide 41 is preferably, generally perpendicularly mounted on the elongated appendages 37 utilizing suitable attaching means known to those skilled in the art. Guide 41 extends between elongated appendages 37 and sufficiently beyond said appendages to slidably contact the elongated legs 29 of support member 21a to locate the outer wall portion 35 effectively opposite the inner wall portion 31 of support member 17a. When outer wall portion 35 is effectively opposite inner wall portion 31, forces applied by pressure bolt 27a and transmitted to outer wall portion 35 through stiffener 39 and force transmitting appendages 37 can secure bearing 23a in a substantially stationary position.

In operation, replacement of bearing 23a can be effectuated by merely removing pressure bolt 27a, sliding the releasable bearing restraining member upwardly from between elongated legs 29 of support member 17a, and removing the split bearing 23a from the device. To insert a bearing in the device, the reverse procedure is followed.

Although the bearing retaining device of this invention can be readily employed where normal atmospheric conditions exist, it has been found to be especially valuable for securing bearings in corrosive environments, such as securing a bearing around a rotatable shaft within a screw type conveyor for transferring corrosive substances.

What is claimed is:

1. A bearing retaining device comprising:
   a bearing member;
   a bearing support member having a closed end and an open end; at the closed end an inner wall portion of a configuration adapted to engage an exterior longitudinal wall portion of said bearing member; and two spaced apart, effectively parallel elongated legs extending from the closed end;
   a releasable bearing restraining member suited to be slidably received between the spaced apart elongated legs, said restraining member having a first end and a second end; at the first end an outer wall portion positioned in operative opposing relationship to the support member inner wall portion and of a configuration adapted to engage an outer longitudinal wall portion of said bearing; at least one elongated force transmitting appendage extending from the first end; and at least one guide, the guide generally perpendicularly mounted on the elongated appendage, the guide extending beyond the elongated appendage sufficiently to slidably contact the legs of said support member to locate the first end outer wall portion of said restraining member effectively opposite the closed end inner wall portion of said support member; and
   a clamping means in operative combination with the second end of said restraining member to exert a force sufficient to restrain a bearing within the restraining member outer wall portion and the support member inner wall portion.

2. The bearing retaining device of claim 1 wherein the inner wall surfaces of said bearing support are adapted to engage an exterior longitudinal wall portion of said bearing.

3. The bearing retaining device of claim 1 wherein said releasable bearing restraining member includes two spaced apart, effectively parallel elongated force transmitting appendages.

4. The bearing retaining device of claim 3 wherein said restraining member includes a pressure equalizing stiffener positioned between the elongated appendages at the second end of said restraining member, the stiffener suited to distribute a force applied by said clamping means between said elongated appendages.

5. The bearing retaining device of claim 3 wherein said clamping means is a pressure plate suited to simultaneously and uniformly apply forces to said elongated appendages.

6. The bearing retaining device of claim 3 including 2 guides mounted on opposing surfaces and extending between the elongated appendages.

7. In combination with a shaft with a peripherally surrounding bearing and a bearing retaining device sealably positioned within a conduit for transporting a corrosive substance, the improvement comprising:
   a bearing support member having a closed end and an open end; at the closed end an inner wall portion of a configuration adapted to engage an exterior longitudinal wall portion of the bearing; and two spaced apart, effectively parallel elongated legs extending from the closed end;
   a releasable bearing restraining member suited to be slidably received between the spaced apart elongated legs, said restraining member having a first end and a second end; at the first end an outer wall portion positioned in operative opposing relationship to the support member inner wall portion and of a configuration adapted to engage an outer longitudinal wall portion of the bearing; and an elongated force transmitting appendage extending from the first end;
   two spaced apart clamping braces attached to the conduit; and
   a clamping means removably attached to said clamping braces, said clamping means in operative combination with the second end of said restraining member to exert a force sufficient to restrain the bearing within the restraining member outer wall portion and the support member inner wall portion, such improvement providing a combination adapted for removal of the bearing from the corrosive substance containing conduit with a minimum of environmental contamination.

8. The improvement of claim 7 wherein said restraining member includes two spaced apart, effectively parallel elongated force transmitting appendages and two guides generally perpendicularly mounted on the elongated appendages, the guides extending beyond the elongated appendages sufficiently to slidably contact the legs of said support member to locate the first end outer wall portion of said restraining member effectively opposite the closed end inner wall portion of said support member.

* * * * *